US008563136B2

(12) United States Patent
Yang et al.

(10) Patent No.: US 8,563,136 B2
(45) Date of Patent: Oct. 22, 2013

(54) CARBON NANOTUBE COMPOSITE MATERIAL AND METHOD FOR MAKING THE SAME

(75) Inventors: Yuan-Chao Yang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 837 days.

(21) Appl. No.: 12/655,506

(22) Filed: Dec. 31, 2009

(65) Prior Publication Data

US 2010/0221536 A1 Sep. 2, 2010

(30) Foreign Application Priority Data

Mar. 2, 2009 (CN) .......................... 2009 1 0105873

(51) Int. Cl.
*B32B 9/00* (2006.01)

(52) U.S. Cl.
USPC ............................ 428/408; 423/448; 977/742

(58) Field of Classification Search
USPC .................... 428/408; 423/447.1, 447.2, 448; 252/502; 977/742
See application file for complete search history.

(56) References Cited

U.S. PATENT DOCUMENTS

| | | | | |
|---|---|---|---|---|
| 7,045,108 | B2 | 5/2006 | Jiang et al. | |
| 2007/0166223 | A1 | 7/2007 | Jiang et al. | |
| 2008/0038538 | A1* | 2/2008 | Ruby | 428/323 |
| 2008/0098805 | A1* | 5/2008 | Jin et al. | 73/105 |
| 2008/0248235 | A1 | 10/2008 | Feng et al. | |
| 2008/0283516 | A1* | 11/2008 | Talle et al. | 219/490 |
| 2008/0299031 | A1 | 12/2008 | Liu et al. | |
| 2010/0190407 | A1 | 7/2010 | Wei et al. | |

FOREIGN PATENT DOCUMENTS

| | | |
|---|---|---|
| CN | 1549314 | 11/2004 |
| CN | 101051586 | 10/2007 |
| JP | 2007-84369 | 4/2007 |
| JP | 2008-163535 | 7/2008 |

OTHER PUBLICATIONS

Guo-Hua Li,Preparation and Electrocatalytic Property for Methanol Oxidation of WC/CNT Nanocomposite,Acta Phys. Chim. Sin,Sep. 23, 2007,1370-1374.
Qin Yu-xiang, Hu Ming, Field emission properties of titanium carbide-modified carbon nanotubes,Acta Physica Sinica,vol. 57,No. 6,Jun.2008.
Zhang Ji-hua et al.,Improved field emission of carbon nanotubes by hafnium coating,Functional Materials,vol. 37, No. 4,Dec. 2006.
Mprovement of field emission of carbon nanotubes by hafnium coating and annealing? Jihua Zhang etl, Nanotechnology. 17, (2006) 257-260.

* cited by examiner

*Primary Examiner* — Maria Veronica Ewald
*Assistant Examiner* — Daniel H Miller
(74) *Attorney, Agent, or Firm* — Altis & Wispro Law Group, Inc.

(57) ABSTRACT

A method for manufacturing a carbon nanotube includes following steps. A carbon nanotube structure comprising of a plurality of carbon nanotubes is provided. Metal is applied to outer surfaces of the carbon nanotubes. The carbon nanotube structure is heated in vacuum to a first temperature and a second temperature greater than the first temperature. At the first temperature, there is a reaction between the carbon nanotubes and the metal layer to form metal carbide particles. At the second temperature, the carbon nanotube structure breaks having at least one tip portion.

11 Claims, 17 Drawing Sheets

CARBON NANOTUBE COMPOSITE MATERIAL AND METHOD FOR MAKING THE SAME

RELATED APPLICATION

This application claims all benefits accruing under 35 U.S.C. §119 from China Patent Application No. 200910105873.8, filed on Mar. 2, 2009 in the China Intellectual Property Office, the disclosure of which is incorporated herein by reference.

BACKGROUND

1. Technical Field

The present disclosure relates to a carbon nanotube composite material and a method for making the same, and particularly, but not exclusively, to a carbon nanotube composite material which can be used as an electron emitting source and a method for manufacturing the same.

2. Description of the Related Art

Carbon nanotubes (CNTs) have been thought to be the most promising material for field electron emission because of properties such as their low threshold voltage, robustness in poor vacuum and easy fabrication, and they have been researched intensively as a cold cathode electron source. However, their emission properties still leave something to be desired, such as emission uniformity over a large area, emission stability, emission current stability etc. Furthermore, emission properties of different CNTs tend to vary widely among samples. To improve the emission performances of CNTs for a practical device, modification is needed.

However, the typical modification methods are complex because they usually use a complicated heating device to heat up the CNTs and because they usually include a complicated annealing step in a vacuum furnace.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

Figure 1:
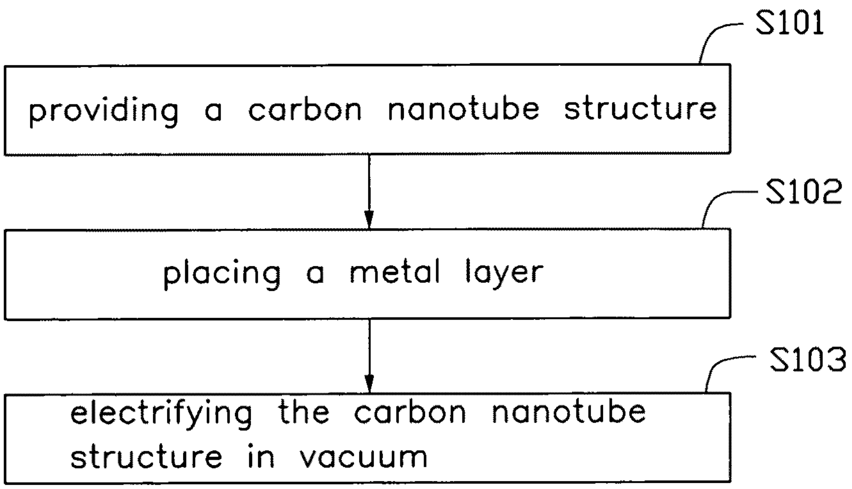
FIG. 1 is a flow diagram of an embodiment for making a carbon nanotube composite material.

Corresponding reference characters indicate corresponding parts throughout the several views. The exemplifications set out herein illustrate at least one preferred embodiment of the disclosure, in one form, and such exemplifications are not to be construed as limiting the scope of the disclosure in any manner.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, a method for making a carbon nanotube composite material according to a first embodiment comprises following steps:

Step 101: providing a carbon nanotube structure comprising of at least one carbon nanotube.

Step 102: applying metal on an outer surface of the at least one carbon nanotube of the carbon nanotube structure.

Step 103: electrifying the carbon nanotube structure in vacuum to a first temperature to cause reaction of the at least one carbon nanotube of the carbon nanotube structure and the metal formed on the outer surface of the at least one carbon nanotube of the carbon nanotube structure.

In step 101, the carbon nanotube structure may be a carbon nanotube array which can be synthesized by chemical vapor deposition. In some carbon nanotube arrays, carbon nanotubes are closely packed together by van der Waals attractive force. An example of such a method for fabricating a carbon nanotube array has been disclosed in U.S. Pat. No. 7,045,108 issued to Yang et al.

The carbon nanotube structure may also be a single carbon nanotube or a free-standing carbon nanotube structure. The free-standing carbon nanotube structure can be a carbon nanotube film or a carbon nanotube wire structure formed from a plurality of carbon nanotubes. The single carbon nanotube can be a single-walled carbon nanotube, a double-walled carbon nanotube, or a multi-walled carbon nanotube. The carbon nanotube film can be a flocculated carbon nanotube film, a pressed carbon nanotube film or a drawn carbon nanotube film.

Flocculated carbon nanotube films can be obtained by flocculating a carbon nanotube array. Carbon nanotubes of the flocculated carbon nanotube film are entangled with each other or isotropically arranged. An example of the flocculated carbon nanotube film has been disclosed in U.S. Pub. No. 20090268559.

Figure 2:
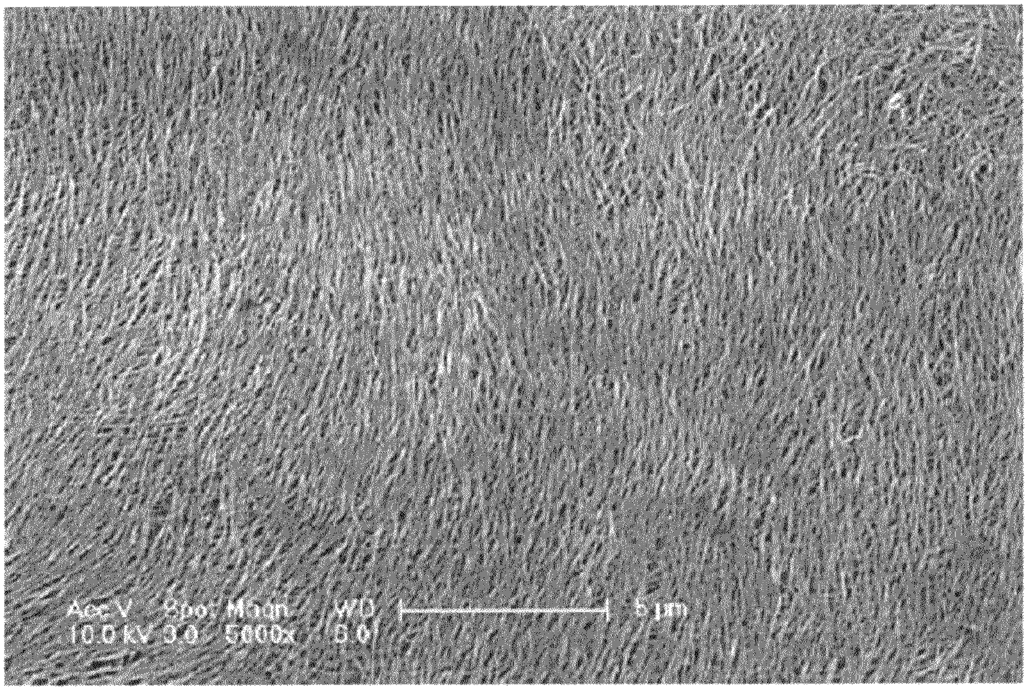
FIG. 2 shows a scanning electron microscope (SEM) image of a pressed carbon nanotube film.

The pressed carbon nanotube film may be manufactured by using a planar pressure head to press the carbon nanotube array along a direction perpendicular to a substrate where the carbon nanotube array grows. Referring to FIG. 2, the pressed carbon nanotube film may be manufactured by using a roller-shaped pressure head to press the carbon nanotube array along a single fixed direction. Then substantially all of the carbon nanotubes of the pressed carbon nanotube film are aligned along the fixed direction. The pressed carbon nanotube film may be manufactured by using roller-shaped pressure head to press the carbon nanotube array along different directions. An example of the pressed carbon nanotube film and a method for fabricating the pressed carbon nanotube film has been disclosed in U.S. Pub. No. 20080299031.

The drawn carbon nanotube film includes a plurality of successive carbon nanotubes joined end-to-end by van der Waals attractive force therebetween. The carbon nanotubes of the drawn carbon nanotube film can be substantially aligned along a single direction. An example of the drawn carbon nanotube film and a method for fabricating the drawn carbon nanotube film has been disclosed in U.S. Pub. No. 20080248235.

Figure 3:
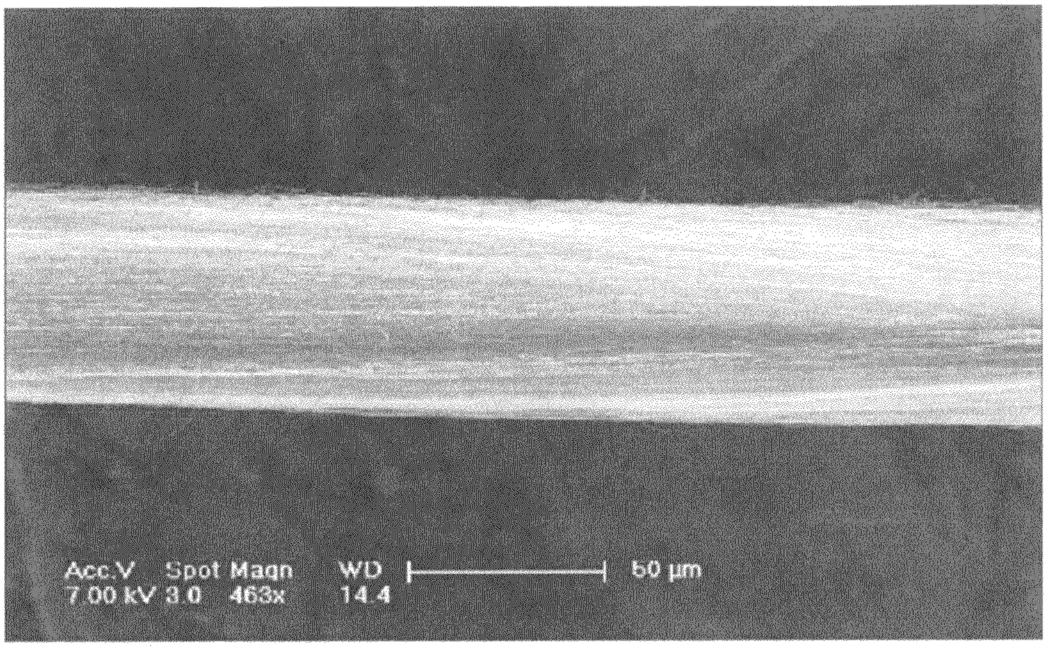
FIG. 3 shows an SEM image of an untwisted carbon nanotube wire.
Figure 4:
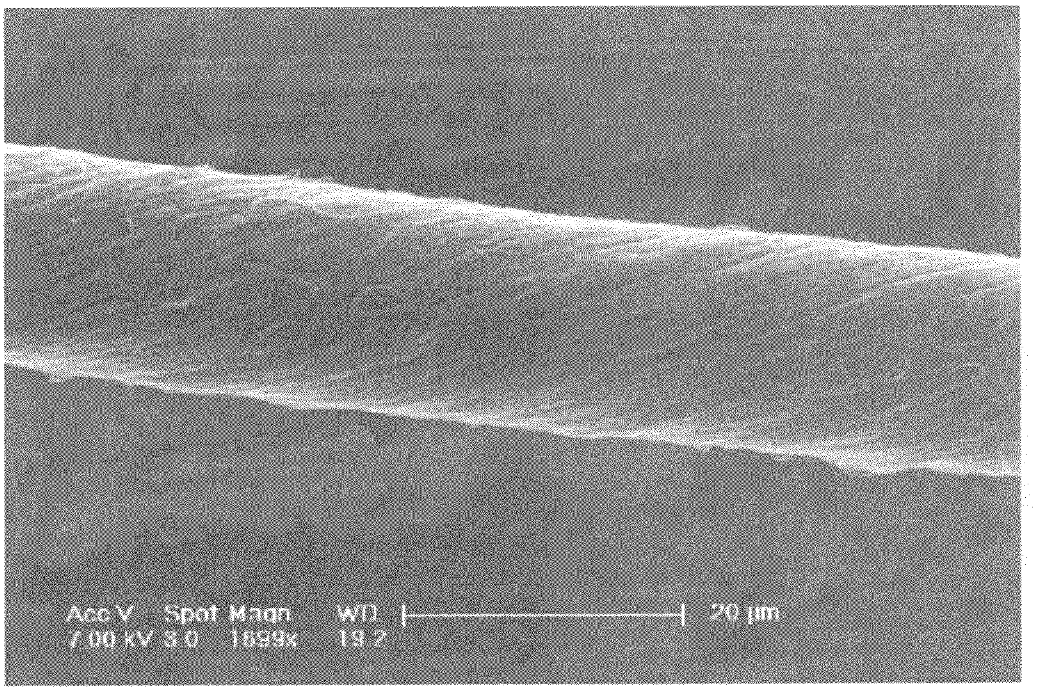
FIG. 4 shows an SEM image of a twisted carbon nanotube wire.

The carbon nanotube wire structure includes at least one carbon nanotube wire. Referring to FIGS. 3-4, the carbon nanotube wire includes a plurality of carbon nanotubes. The carbon nanotubes of the carbon nanotube wire are joined end-to-end by van der Waals attractive force therebetween. The carbon nanotube wire structure may include a plurality of carbon nanotube wires which can be parallel to each other to form a bundle-like structure or twisted with each other to form a twisted structure. The carbon nanotube structure may include a plurality of carbon nanotube wire structures which can be paralleled with each other, cross with each other, weaved together, or twisted with each other.

The carbon nanotube wire can be formed by treating a carbon nanotube film with an organic solvent or by twisting a carbon nanotube film by using a mechanical force. An untwisted carbon nanotube wire carbon nanotube wire is formed by treating a carbon nanotube film with an organic solvent. The untwisted carbon nanotube wire includes a plurality of successive carbon nanotubes, which are substantially oriented along the linear direction of the untwisted carbon nanotube wire and joined end-to-end by van der Waals attractive force therebetween. A twisted carbon nanotube wire is formed by twisting a carbon nanotube film by using a mechanical force. The twisted carbon nanotube wire includes a plurality of carbon nanotubes oriented around an axial direction of the twisted carbon nanotube wire. Length of the carbon nanotube wire can be set as desired and the diameter of the carbon nanotube wire can range from about 0.5 nanometers to about 100 micrometers. The twisted carbon nanotube wire can be treated with an organic solvent before or after twisting. An example of the untwisted carbon nanotube wire and a method for manufacturing the same has been taught by US Patent Application Pub. No. US 2007/0166223.

In step 102, the metal formed on the outer surface of the at least one carbon nanotube of the carbon nanotube structure may be made of transition metal, such as hafnium, tantalum, titanium or zirconium. The metal can be coated on the outer surface of each of the carbon nanotubes of the carbon nanotube structure by magnetron sputtering method or by electron beam evaporation method. When the metal is applied on the outer surface of the at least one carbon nanotube of the carbon nanotube structure, a metal layer if formed. The metal layer has a thickness of about 1 nanometer to about 100 nanometers. The metal layer is formed from a plurality of metal particles which ranging in size from about 1 nanometer to about 100 nanometers. In one embodiment, the metal layer is a layer of hafnium and has a thickness of about 50 nanometers.

In step 103, the carbon nanotube structure is positioned and electrically connected to two electrodes in vacuum to cause reaction of the carbon nanotubes of the carbon nanotube structure and the metal layer. Explanatory examples will be given below to illustrate how to electrically connect the carbon nanotube structure to the two electrodes.

In one explanatory example, a carbon nanotube array is the carbon nanotube structure. One of the two electrodes is placed on and attached to a free end of the carbon nanotube array. The substrate is removed from the carbon nanotube array to expose a new free end. The other one of the two electrodes is attached to the new free end of the carbon nanotube array. As a result, the carbon nanotube array is electrically connected to the electrodes and carbon nanotubes of the carbon nanotube array extend from one of the electrodes to the other one of the electrodes.

Alternatively, a segment of carbon nanotubes can be first drawn out from the substrate by using a tool such as a tweezers. Then the segment of carbon nanotubes is positioned between the two electrodes and opposite ends of the segment of carbon nanotubes connect with the two electrodes.

In another explanatory example, a flocculated carbon nanotube film is taken as an example of the carbon nanotube structure. In this situation, the two electrodes can be spaced apart at any positions on the carbon nanotube structure because carbon nanotubes of the flocculated carbon nanotube film can form an electrically conductive net structure.

In still another explanatory example, a pressed carbon nanotube film, a drawn carbon nanotube film, or a carbon nanotube wire structure is the carbon nanotube structure. In this situation, the two electrodes are positioned at opposite ends of the carbon nanotube structure.

After the carbon nanotube structure has been electrically connected to the two electrodes in a vacuum, a voltage is applied across the two electrodes. Then, electrical current flows through the carbon nanotube structure heating the carbon nanotube structure to a first temperature at which the carbon nanotubes of the carbon nanotube structure react with the metal layer. For example, the carbon nanotubes of the carbon nanotube structure react with the metal layer of hafnium at a first temperature of about 1600 Kelvin.

At the first temperature, the metal particles of the metal layer are fused. Carbon atoms of the carbon nanotube structure in contact with the metal layer diffuse into the metal layer and a reaction occurs therebetween, forming a metal carbide. The metal carbide exists on a surface of the carbon nanotubes of the carbon nanotube structure in the form of particles because of the surface tension of the metal layer while in a fused state. The metal carbide particles have a size ranging from about 1 nanometer to about 100 nanometers and are arranged with a distance of about 1 nanometer to about 100 nanometers defined between adjacent two particles.

By applying an electrical current to the carbon nanotube structure in a vacuum, the complicated heating device and the complicated annealing step in a vacuum furnace of the related art are eliminated. The method of this disclosure is easy and of low cost when compared with the related art.

Furthermore, the carbon nanotube structure and the metal layer are heated by the electrical current flowing therethrough, this helps save energy because the surrounding environment need not be heated as well. Moreover, it is easy to accurately control the heating temperature of the carbon nanotube structure and the metal layer via adjustment of the voltage or the electrical current applied to the carbon nanotube structure.

Figure 5:
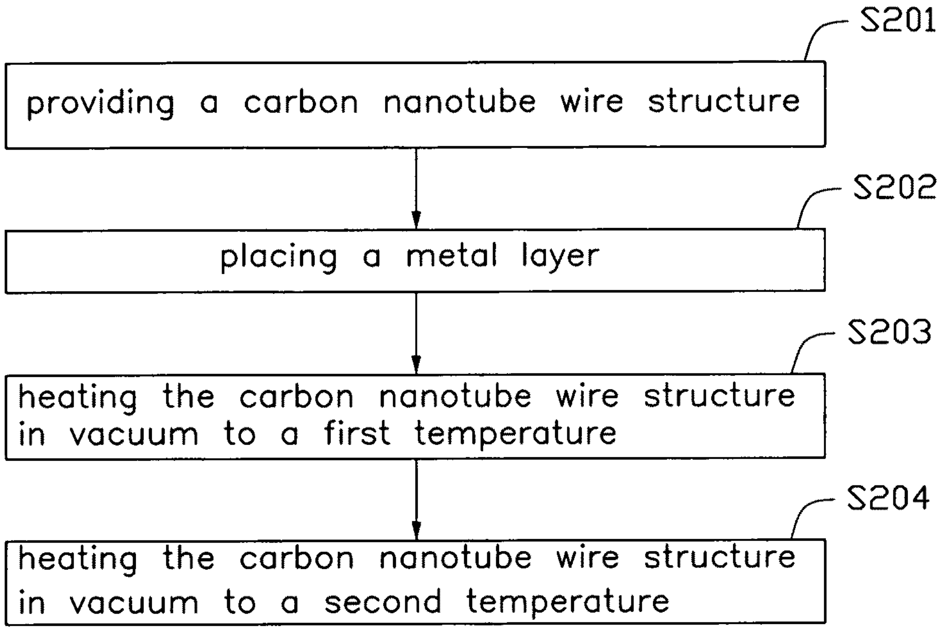
FIG. 5 is a flow diagram of one embodiment for making a carbon nanotube composite material.

Referring to FIG. 5, an embodiment for making a carbon nanotube composite material according comprises following steps:

Step 201: providing a carbon nanotube wire structure. The carbon nanotube wire structure includes a plurality of carbon nanotubes extending along an axis direction of the carbon nanotube wire structure. The carbon nanotubes are joined end-to-end by van der Waals attractive force therebetween.

Step 202: applying metal on an outer surface of at least one carbon nanotube of the carbon nanotube wire structure.

Step 203: electrifying the carbon nanotube wire structure in vacuum until the carbon nanotube wire structure heats to the first temperature. At the first temperature, the metal particles of the metal layer are fused and react with the carbon atoms to form metal carbide.

Step 204: electrifying the carbon nanotube wire structure in vacuum until the carbon nanotube wire structure heats to a second temperature. In this process, a thermal stress concentration is introduced near a middle of the carbon nanotube wire structure because the carbon nanotube wire structure suffers from uneven temperature distribution due to non-uniform heating or non-uniform heat dissipation. For example, parts of the carbon nanotube wire structure, which are near or contact the electrodes, will have a faster heat dissipation rate than the other parts of the carbon nanotube wire structure. As a result, the carbon nanotube wire structure will break into two portions near the middle of the carbon nanotube wire structure. Each portion has a tip portion formed thereon.

The tip portion is a tapered structure, which is formed from a plurality of carbon nanotubes packed together by van der Waals attractive force. In the tip portion, one or just a few carbon nanotubes extend beyond the other carbon nanotubes, then the tip portion has a smallest size of about one or two times the size of one carbon nanotube. Thus, when the carbon nanotube composite material is used as an electron emitting source, it will have a very low field-emission voltage.

Figure 6:
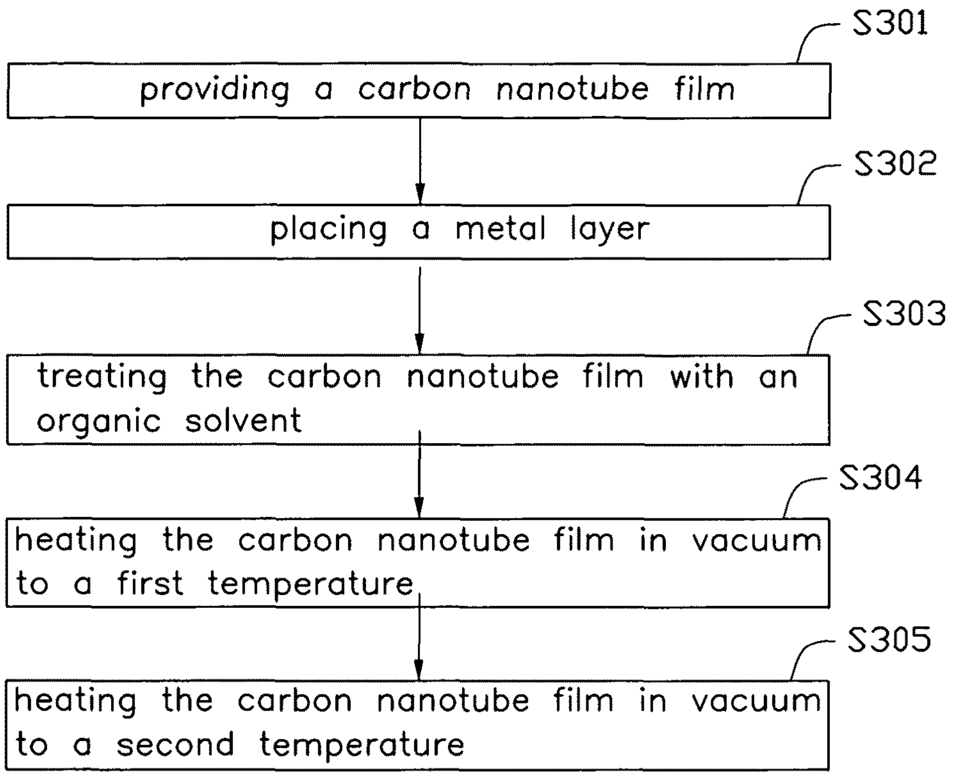
FIG. 6 is a flow diagram of an embodiment for making a carbon nanotube composite material.
Figure 7:
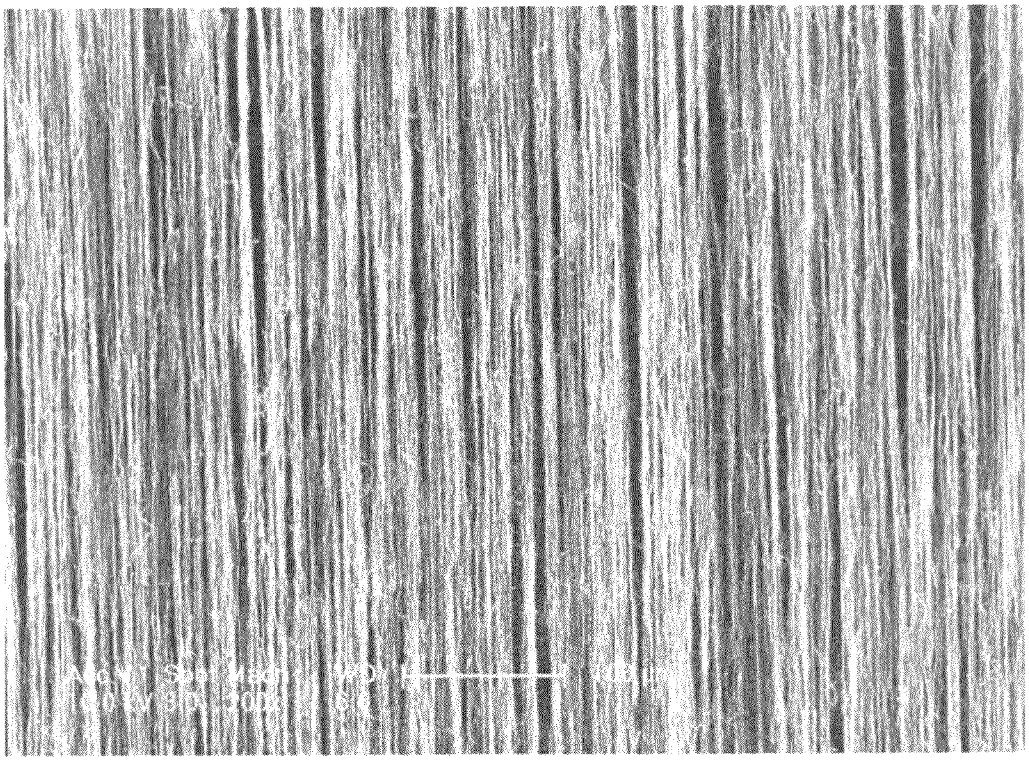
FIG. 7 shows an SEM image of a carbon nanotube film.
Figure 8:
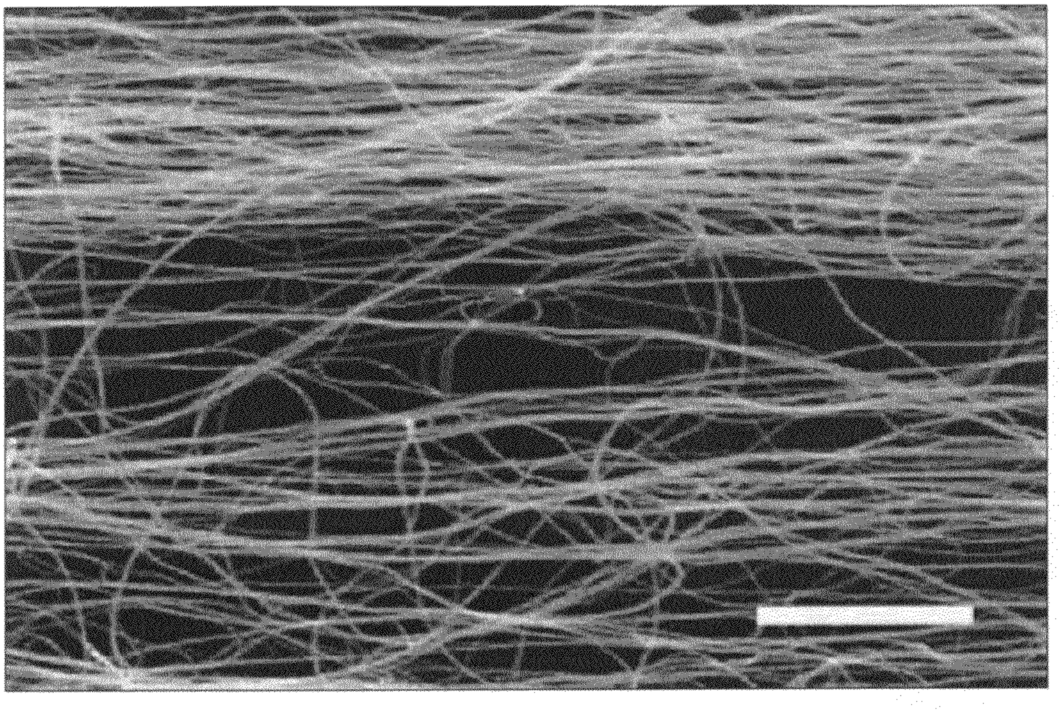
FIG. 8 shows an SEM image of the carbon nanotube film.

Referring to FIG. 6, one embodiment for making a carbon nanotube composite material comprises following steps:

Step 301: providing two electrodes and a carbon nanotube film. Referring to FIGS. 7-8, the carbon nanotube film includes a plurality of successive and oriented carbon nanotubes joined end-to-end by van der Waals attractive force therebetween.

Figure 9:
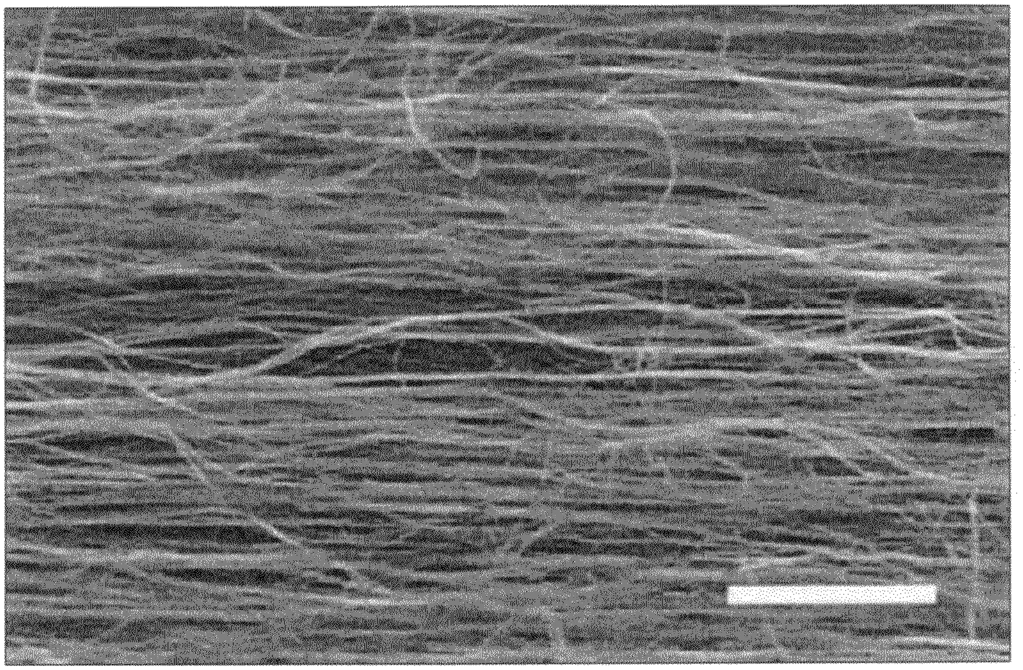
FIG. 9 shows an SEM image of the carbon nanotube film of the type shown in FIG. 7 after being coated with a hafnium layer when the micron marker is 2 microns.

Step 302: applying metal on an outer surface of at least one carbon nanotube of the carbon nanotube film. Referring to FIG. 9, it shows a metal layer of hafnium being plated on the carbon nanotube film, the metal layer of hafnium having a thickness of about 50 nanometers.

Figure 10:
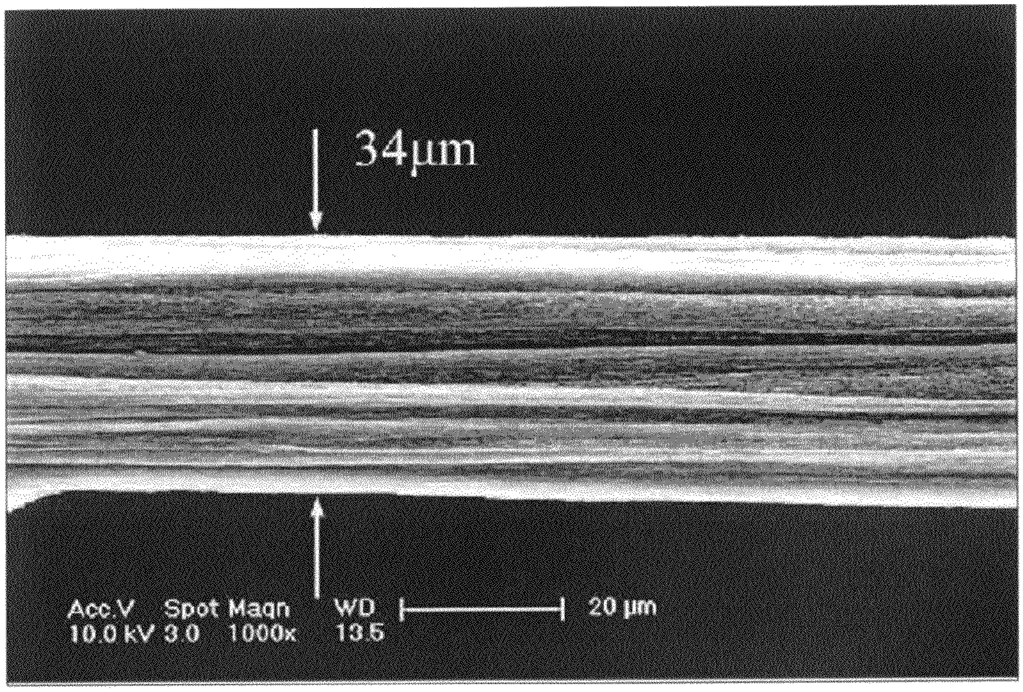
FIG. 10 shows an SEM image of a carbon nanotube wire structure formed by treating the carbon nanotube film of the type shown in FIG. 9 with an organic solvent.

Step 303: treating the carbon nanotube film with an organic solvent so that the carbon nanotube film is shrunk into a carbon nanotube wire structure. As shown in FIG. 10, the carbon nanotube film is shrunk into a carbon nanotube wire structure having a diameter or size of about 34 microns. Thus, after being soaked by the organic solvent, the carbon nanotube film has a decreased outer surface area and improved heat resistance.

Step 304: applying a voltage of about 10 volts to 20 volts to the carbon nanotube wire structure, formed in the step 303, in a vacuum, until the carbon nanotube wire structure heats to the first temperature and until the metal particles of the metal layer are fused and react with the carbon atoms forming the metal carbide particles.

Figure 11:
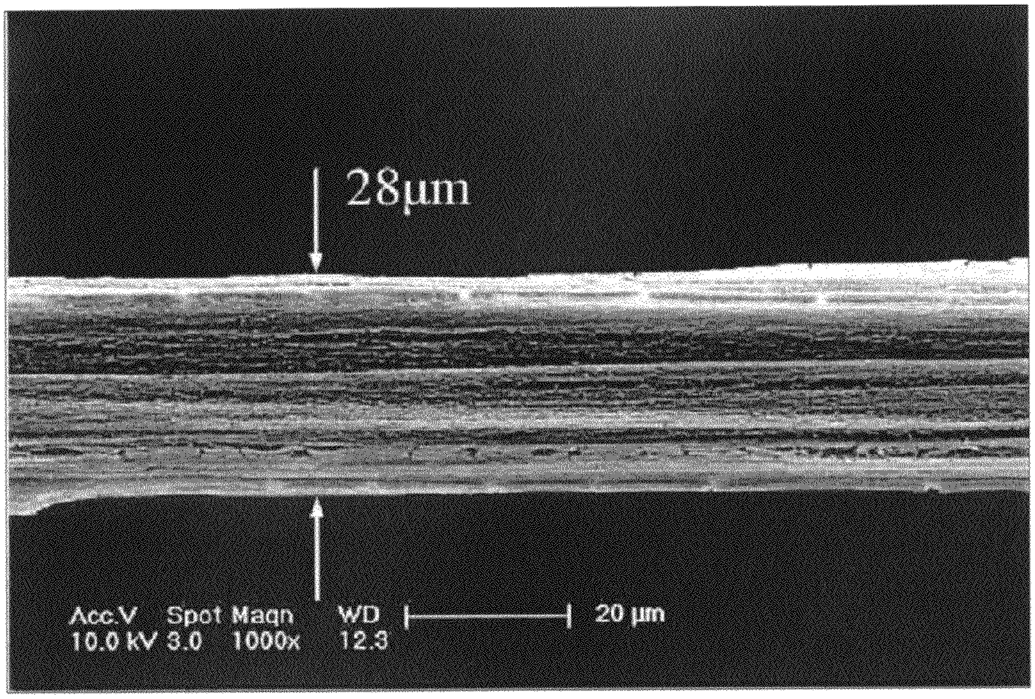
FIG. 11 shows an SEM image of a structure resulted from reaction of carbon nanotubes of the carbon nanotube wire structure of the type shown in FIG. 10 and a metal layer.

At the same time, the diameter or size of the carbon nanotube wire structure of one embodiment is decreased to about 28 microns as shown in FIG. 11 owing to the surface tension of the metal layer in a fused state. That is, the diameter of the carbon nanotube wire structure is decreased by 20%, from about 34 microns to about 28 microns, when the carbon nanotube structure in vacuum reaches the first temperature. Then, the carbon nanotube wire structure will have an improved field enhancement factor due to its small size.

Figure 12:
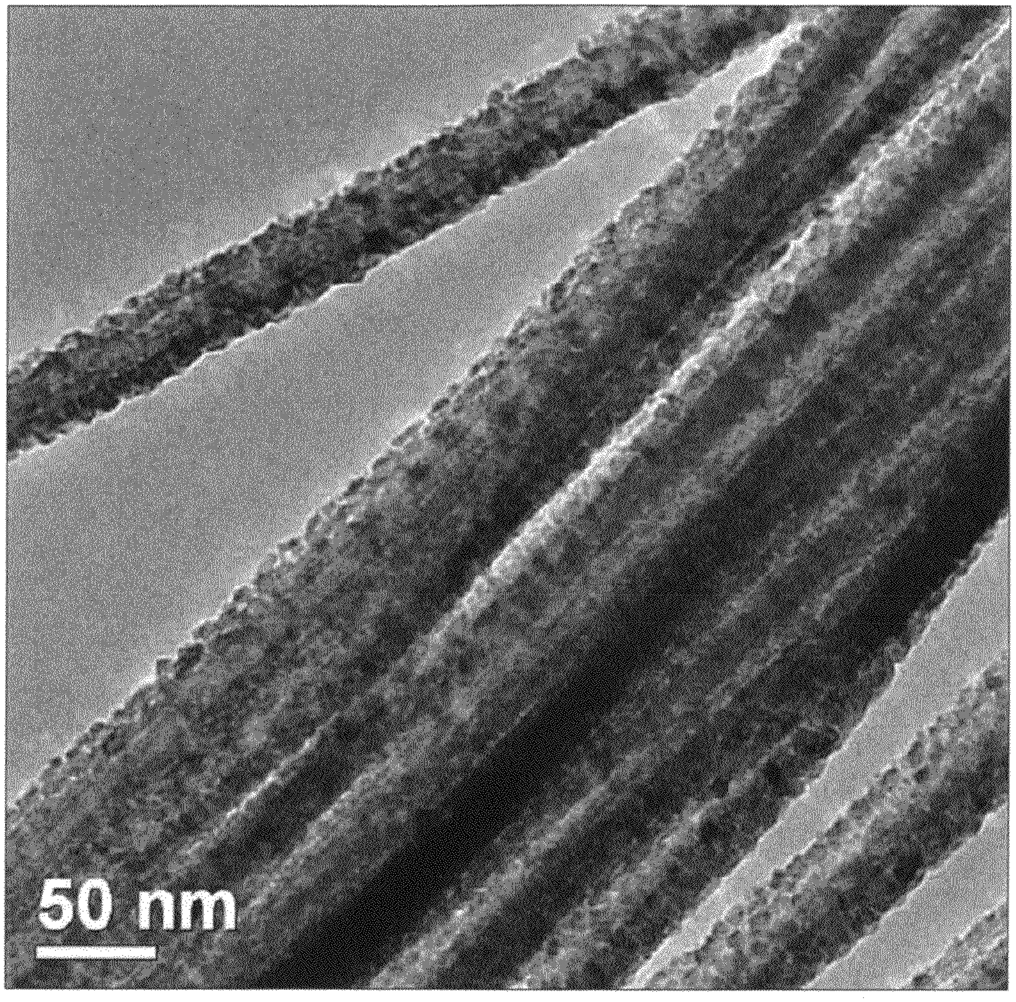
FIG. 12 shows a transmission electron microscope (TEM) image of the carbon nanotube wire structure of the type shown in FIG. 10.
Figure 13:
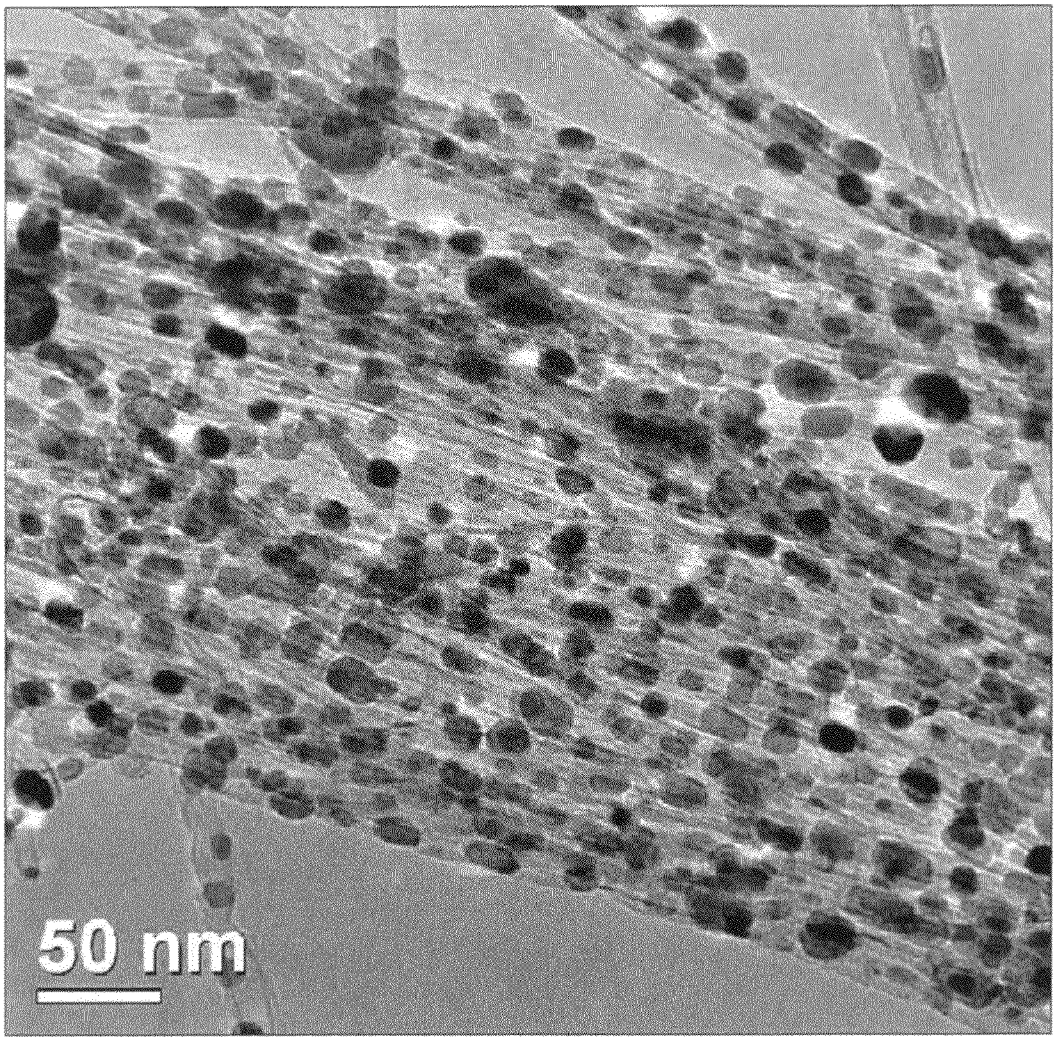
FIG. 13 shows a TEM image of the carbon nanotube wire structure of the type shown in FIG. 11.
Figure 14:
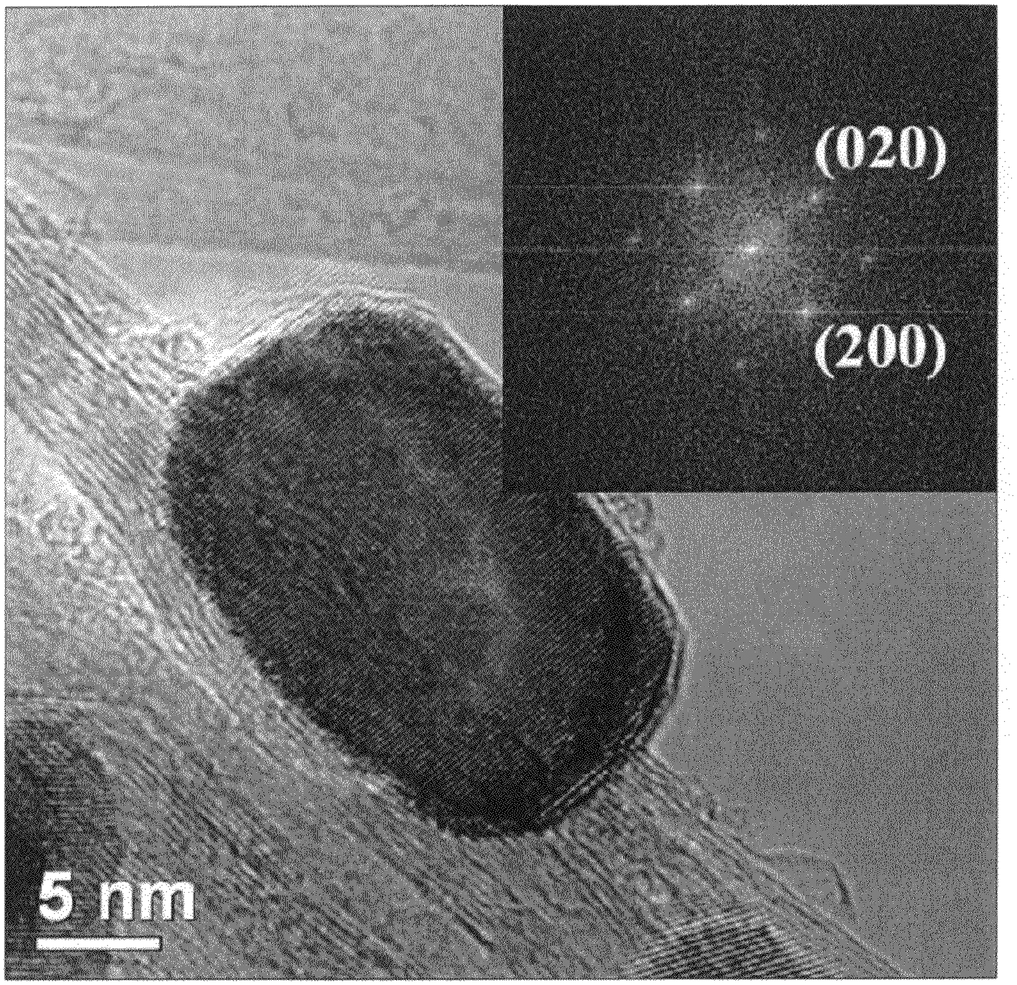
FIG. 14 shows a TEM image of hafnium carbide particles of the type shown in FIG. 13.
Figure 15:
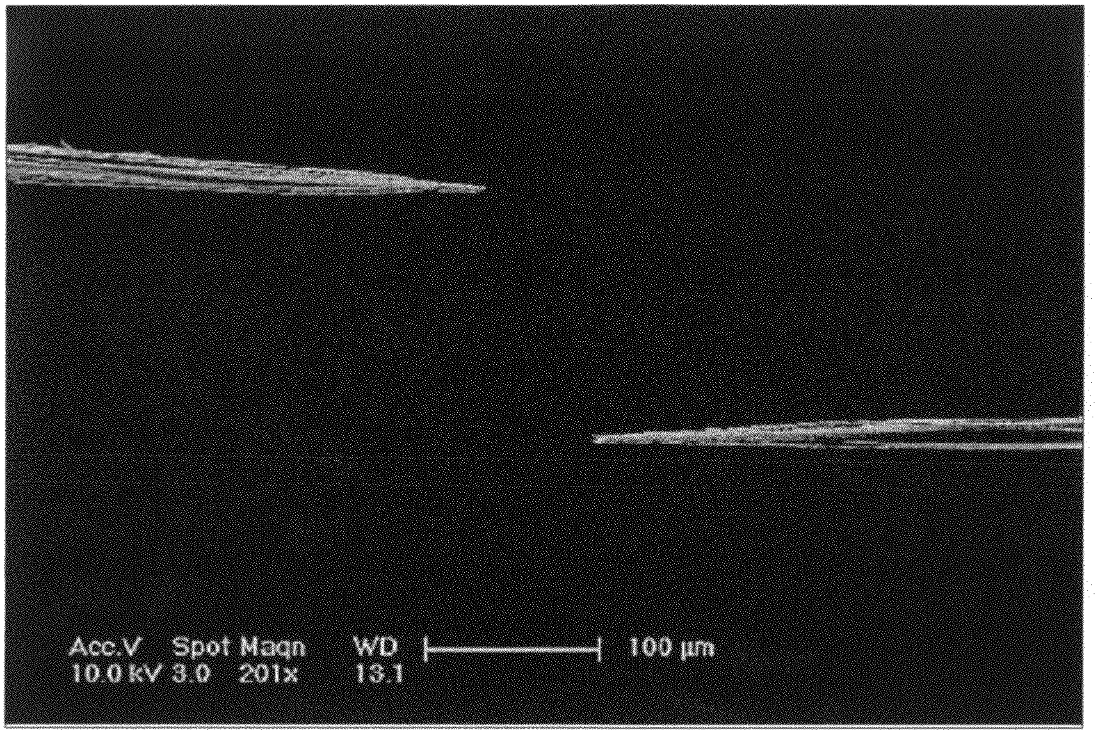
FIG. 15 shows an SEM image of a tip portion of the carbon nanotube wire structure of the type shown in FIG. 11 after heat treatment.
Figure 16:
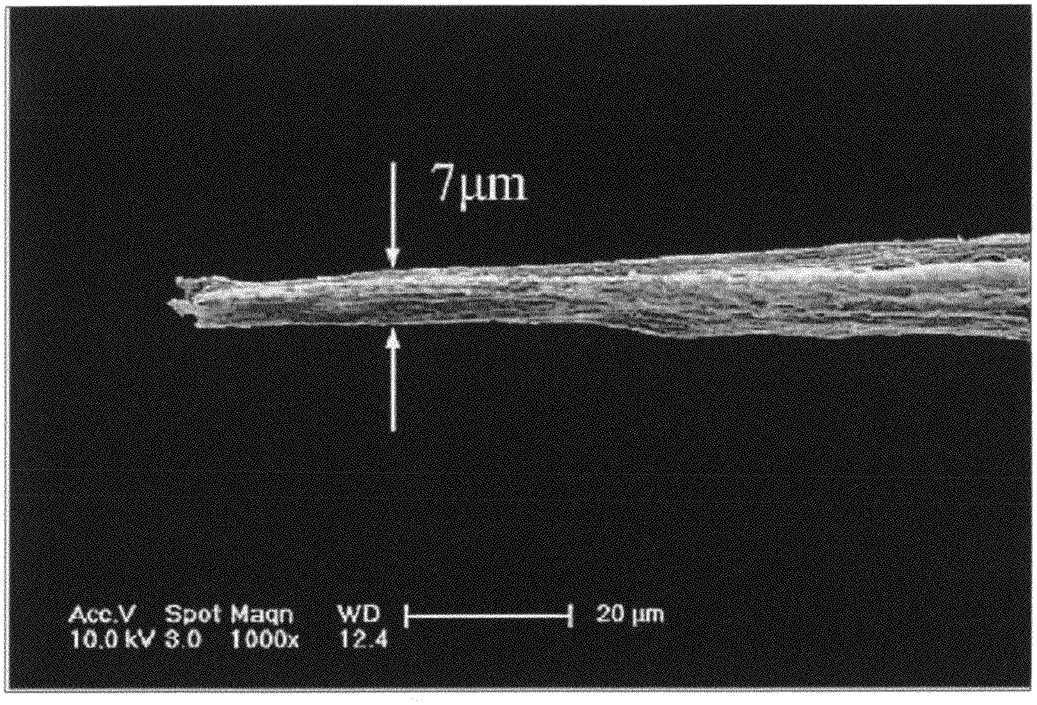
FIG. 16 shows an enlarged, SEM image of the tip portion of the type shown in FIG. 15.
Figure 17:
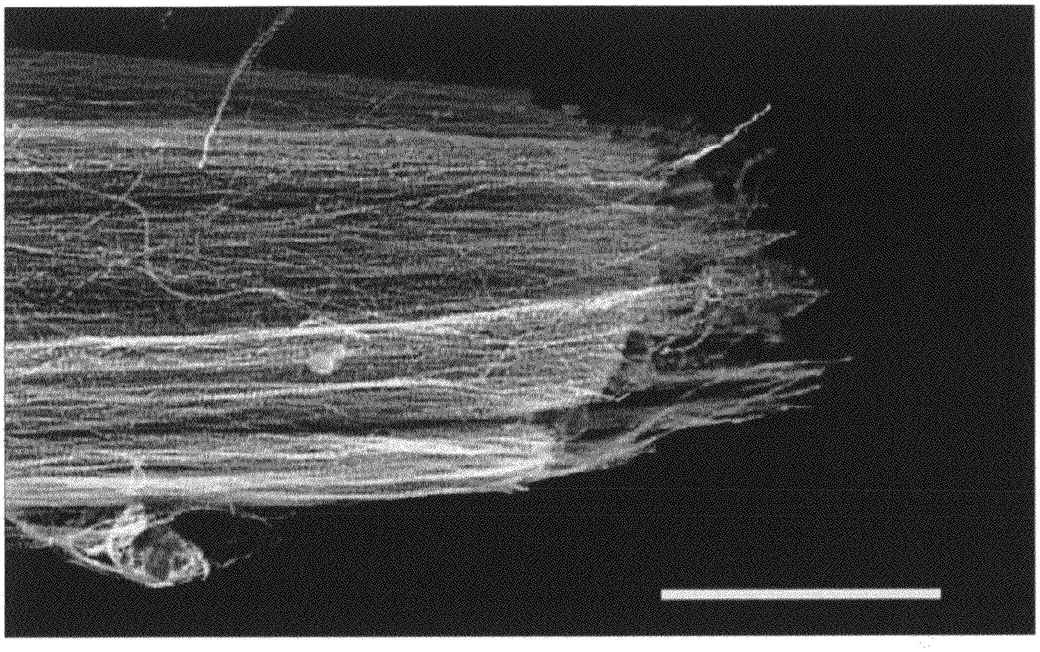
FIG. 17 shows an SEM image of the tip portion of the type shown in FIG. 16.

With reference now primarily to FIGS. 12-14, in an outer surface of most, if not all, carbon nanotubes of the carbon nanotube wire structure, some of the metal particles distributed and implanted. An average interval of about 1 nanometer to about 100 nanometers is defined between adjacent metal layer particles which are located on a same carbon nanotube. Additionally, when the metal layer particles are hafnium carbide particles, each of the hafnium carbide particles are face-centered cubic crystal structure.

Step 305: applying a voltage greater than 20 volts to the carbon nanotube wire structure formed in the step 304 in vacuum, until the carbon nanotube wire structure is heated to a second temperature above 2136 Kelvin and until the carbon nanotube wire structure is broken into two portions each having a tip portion formed thereon. The tip portions each have a diameter or size less than that of the carbon nanotube wire structure to assure that the carbon nanotube wire structure has good field-emission property with the ability to be a point electron source.

In this step, a thermal stress concentration is introduced near a middle of the carbon nanotube wire structure because the carbon nanotube wire structure suffers from uneven temperature distribution due to non-uniform heating or non-uniform heat dissipation. Then the carbon nanotube wire structure is easily broken in the middle.

In this method shown in FIG. 6, the carbon nanotube wire structure has a diameter or size that can change during the step 304. This helps to reduce stress concentration between the carbon nanotubes and the metal carbide particles to assure that the metal carbide particles are firmly implanted in the carbon nanotubes.

It is to be understood that the above-described embodiments are intended to illustrate rather than limit the invention. Variations may be made to the embodiments without departing from the spirit of the invention as claimed. It is understood that any element of any one embodiment is considered to be disclosed to be incorporated with any other embodiment. The above-described embodiments illustrate the scope of the invention but do not restrict the scope of the invention.

It is also to be understood that above description and the claims drawn to a method may include some indication in reference to certain steps. However, the indication used is only to be viewed for identification purposes and not as a suggestion as to an order for the steps.

What is claimed is:

1. A method for manufacturing a carbon nanotube composite material comprising:

providing a carbon nanotube wire structure comprising of a plurality of carbon nanotubes;

applying metal to outer surfaces of the carbon nanotubes;

heating the carbon nanotube wire structure in vacuum to a first temperature and a second temperature; wherein at the first temperature, the metal is fused to form a fused metal, there is a reaction between the plurality of carbon nanotubes and the fused metal to form metal carbide particles, and the carbon nanotube wire structure is decreased in diameter by about 20% to form a decreased carbon nanotube wire structure; and at the second temperature greater than the first temperature, the decreased carbon nanotube wire structure breaks to form a broken carbon nanotube wire structure and the broken carbon nanotube wire structure has at least one tip portion.

2. The method of claim 1, wherein heating the carbon nanotube wire structure comprises electrically connecting the carbon nanotube wire structure to two electrodes in vacuum; and applying a first voltage to reach the first temperature, and a second voltage to reach the second temperature.

3. The method of claim 1, wherein the carbon nanotube wire structure comprises of a twisted or untwisted carbon nanotube wire.

4. The method of claim 2, wherein end parts of the carbon nanotube wire structure contact the electrodes and have a faster heat dissipation rate than the other parts of the carbon nanotube wire structure, the carbon nanotube wire structure breaks into two portions near a middle of the carbon nanotube wire structure due to a thermal stress concentration.

5. A method for manufacturing a carbon nanotube composite material comprising:

providing a carbon nanotube wire structure comprising of at least one carbon nanotube;

applying metal to an outer surface of the at least one carbon nanotube of the carbon nanotube wire structure; and electrifying the carbon nanotube wire structure in vacuum to a first temperature, wherein at the first temperature, the metal is fused to form a fused metal, there is a reaction between the at least one carbon nanotube and the fused metal to form metal carbide particles, and the carbon nanotube wire structure is decreased in diameter by about 20% to form a decreased carbon nanotube wire structure.

6. The method of claim 5, wherein electrifying the carbon nanotube wire structure in vacuum comprises electrically connecting the carbon nanotube wire structure to two electrodes in vacuum; and applying a first voltage to reach the first temperature.

7. The method of claim 6, further comprising a step of electrifying the decreased carbon nanotube wire structure in vacuum to a second temperature, wherein the second temperature is greater than the first temperature and the decreased carbon nanotube wire structure breaks to form a broken carbon nanotube wire structure and the broken carbon nanotube wire structure has at least one tip portion.

8. The method of claim 7, wherein the broken carbon nanotube wire structure includes a plurality of carbon nanotubes and the at least one tip portion is a tapered structure which is formed from some of the carbon nanotubes packed together by van der Waals attractive force.

9. The method of claim 7, wherein the first temperature is of about 1600 Kelvin and the second temperature is of above 2136 Kelvin.

10. The method of claim 6, wherein the carbon nanotube wire structure is formed from a carbon nanotube film.

11. The method of claim 10, wherein the carbon nanotube film is treated by an organic solvent to form the carbon nanotube wire structure, or the carbon nanotube film is twisted by using a mechanical force to form the carbon nanotube wire structure, or the carbon nanotube film is treated with an organic solvent before or after being twisted to form the carbon nanotube wire structure.

* * * * *